US010125426B1

(12) United States Patent
Liu et al.

(10) Patent No.: US 10,125,426 B1
(45) Date of Patent: Nov. 13, 2018

(54) THERMAL SCAVENGING SYSTEM TO REMOVE RESIDUE FROM INTERIOR SURFACE OF SEAMLESS TUBE IN A BRIGHT ANNEALING FURNACE

(71) Applicant: American International Materials, Inc., San Rafael, CA (US)

(72) Inventors: Mei-Kao Liu, San Rafael, CA (US); Eric Y. Liu, San Rafael, CA (US); Jueguang Wang, Shanghai (CN)

( * ) Notice: Subject to any disclaimer, the term of this patent is extended or adjusted under 35 U.S.C. 154(b) by 356 days.

(21) Appl. No.: 14/972,110

(22) Filed: Dec. 17, 2015

Related U.S. Application Data

(60) Provisional application No. 62/209,887, filed on Aug. 26, 2015.

(51) Int. Cl.
| | |
|---|---|
| C21D 9/08 | (2006.01) |
| C23G 5/00 | (2006.01) |
| C22F 1/10 | (2006.01) |
| C21D 9/00 | (2006.01) |
| C21D 1/26 | (2006.01) |
| C21D 1/767 | (2006.01) |

(52) U.S. Cl.
CPC ............... *C23G 5/00* (2013.01); *C21D 1/26* (2013.01); *C21D 1/767* (2013.01); *C21D 9/0056* (2013.01); *C21D 9/08* (2013.01); *C22F 1/10* (2013.01)

(58) Field of Classification Search
CPC ................................. B21B 3/02; B21B 1/227
See application file for complete search history.

(56) References Cited

U.S. PATENT DOCUMENTS

| | | | | | |
|---|---|---|---|---|---|
| 4,039,148 | A | * | 8/1977 | Tamura | C21D 9/0018 198/867.14 |
| 2014/0017517 | A1 | * | 1/2014 | Kawagoe | C21D 6/002 428/687 |

FOREIGN PATENT DOCUMENTS

KR           20070095475 A  * 10/2007

OTHER PUBLICATIONS

Machine translation of KR 200700954575 Oct. 2007.*

* cited by examiner

*Primary Examiner* — Scott R Kastler

(57) ABSTRACT

A thermal scavenging system to remove remnant lubricants from interior of bright annealing steel tubes is provided. The system is retrofitted to bright annealing furnace with a conveyer belt and hydrogen gas source and comprises hydrogen-blowing rack, flexible rubber hoses and a lighter. The tubes are placed on the conveyer belt. The hydrogen-blowing rack comprises a hydrogen gas manifold and outlet nozzles connected to tailing ends of the tubes by flexible rubber hoses. At the leading ends of the tubes, a lighter ignites the hydrogen gas to insure all tubes are filled with hydrogen gas, instead of atmospheric air. Then rubber hoses are unplugged from the leading ends and the hydrogen-filled tubes are fed into the furnace for heat treatment. At high annealing temperature, lubricant remnants are burned off the tube's interior surfaces. A negative difference in atmospheric pressure, combustion products of hydrocarbons are scavenged out from the tailing ends.

1 Claim, 8 Drawing Sheets

THERMAL SCAVENGING SYSTEM TO REMOVE RESIDUE FROM INTERIOR SURFACE OF SEAMLESS TUBE IN A BRIGHT ANNEALING FURNACE

TECHNICAL FIELD

Embodiments of the disclosure relate generally to steel tubing. Embodiments relate more particularly to an apparatus to remove remnant lubricant contaminants from the interior surface of steel tubes produced in a bright annealing furnace.

BACKGROUND

The production of stainless steel seamless tube will primarily rely on cold drawing and/or cold rolling (pilgering) machines to reduce the tube to desirable tube diameter and/or wall thickness. The mechanically worked tube will thus be required to go through annealing process, a critical production step to reduce the hardness of a material to facilitate the progress of subsequent manufacturing operations. Traditional production of stainless steel seamless tube generally use open-hearth fossil-fuel-fired furnace. As a result of open-hearth annealing, a black oxidize layer will be formed on the tube surface due to exposure to atmospheric oxygen. The cleaning of this blacken oxidized layer is then accomplished by soaking the tube in a pickling tank over long period of time. Thus, the traditional production adopting open-hearth fossil-fuel-fired furnace is time consuming and environmentally unsound.

Alternatively the tube annealing, after the drawing and/or rolling steps, can be achieved in a bright annealing furnace by burning hydrogen to the annealing temperature in a sealed chamber filled with hydrogen. Since hydrogen is an inert gas, a black oxidize layer will not be formed on the tube surface. The resultant uniform and smooth tube surface has thus earned the hydrogen-fired furnace the name of 'bright annealing furnace'.

Cold rolling is employed to reduce tube outer diameter and/or wall thickness in the production of bight annealing stainless steel seamless tube. The application of rolling machine requires the use of high viscosity heavy lubricants and this leaves behind remnant lubricant on both outer and interior tube surfaces. Cleaning the exposed outer tube surface will not present any problems. However, due to lack of access into the tube interior, particularly for tubes with small bore, thorough cleaning of tube interior surface is a major challenge. Conventional methods employed to clean lubricant residue from interior surface of the tube is the mechanical scrubbing scheme. Tightly squeezed sponge or cotton balls, soaked with chemical solvent such as acetone and inserted in one end of the tube, shot through the tube bore by a high-speed gas gun.

Further, ultrasonic vibration is also employed to remove blob of lubricant residue from the interior of tube surface. For ultrasonic cleaning, tubes are placed in a tank and soaked in warm and soaping water and are subjected to high frequency vibrations for hours to shake away remnant lubricant from the tube surface. For better cleaning results, tubes were subjected to ultrasonic vibration first and then followed by mechanical scrubbing. However, for tubes with very small outer diameter, these conventional methods still fail to eliminate the very thin film of lubricant remnant present on the interior surface of the tube. Within this very thin layer, known as boundary layer in viscous fluid dynamics, the remnant lubricant will firmly stuck to the adjacent tube surface. The thickness of this layer, depending on the lubricant viscosity and rolling pressure or tube reduction ratio, varies from a few micrometers to less than one micrometer. This thin film will induce slight but uniform discoloration on the interior surface of the tube. In addition, this thin film contains hydrocarbons which may prove to be harmful for certain critical tube applications.

In the light of the above discussion, there appears to be a need a new and novel approach to eliminate the presence of this thin film of remnant lubricant from the interior surface of the tube produced by bright annealing furnace that will overcome the existing shortcomings of the conventional cleaning methods, employed alone or in combination.

OBJECT OF INVENTION

The principal object of the embodiments herein is to provide a thermal scavenging system that eliminates the thin film of remnant lubricant from the interior of the tubes thereby restoring the unique luster of the tube.

Another object of the embodiments herein is to is to address the problem of cleaning the tube interior of bright annealed stainless steel seamless tubes, especially tubes with small outer diameter (generally 2" or smaller).

Yet another object of the present invention is to facilitate the production of stainless steel tubes that requires extra clean interior surface or absence of hydrocarbon contamination.

SUMMARY

The above-mentioned needs are met by a thermal scavenging system and method to remove remnant lubricant contaminants from the interior surface of steel tubes produced in a bright annealing furnace.

An example of a thermal scavenging system as a retrofit to a traditional bright annealing furnace. The tubes are placed on the conveyer belt of the bright-annealing furnace. The hydrogen-blowing rack contains a hydrogen gas inlet nozzle, connected to the hydrogen source, and at least one outlet nozzle connected to the tailing end of the tubes by a flexible rubber hose. After the hydrogen gas flow purging out all atmospheric air inside the tubes, the tailing ends of tubes will then be removed from hydrogen blowing rack. The lighter is used to test the emergence of hydrogen gas from the leading ends of the tubes, insuring that tube interior is completely filled with pure hydrogen. Then the tubes will begin their normal journey into the bright annealing furnace and receive standard heat treatment. The interiors of tubes entering the annealing furnace are now filled with pure hydrogen not air. As they reach annealing temperature, remnant hydrocarbons imbedded in the thin boundary layer will be burned off in an inert environment. Since annealing furnaces always maintain a slightly positive pressure difference to prevent intrusion of ambient air, the products of the combustion will be slowly purged out from the tailing ends of the tubes to the atmosphere.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

These and other features of the present invention will become readily apparent upon further review of the following specification and drawings. Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the concept thereof.

The following detailed description is intended to provide exemplary implementations to one of ordinary skill in the art, and is not intended to limit the invention to the explicit disclosure. As one of ordinary skill in the art will understand, variations can be substituted that are within the scope of the invention as described.

Figure 1:
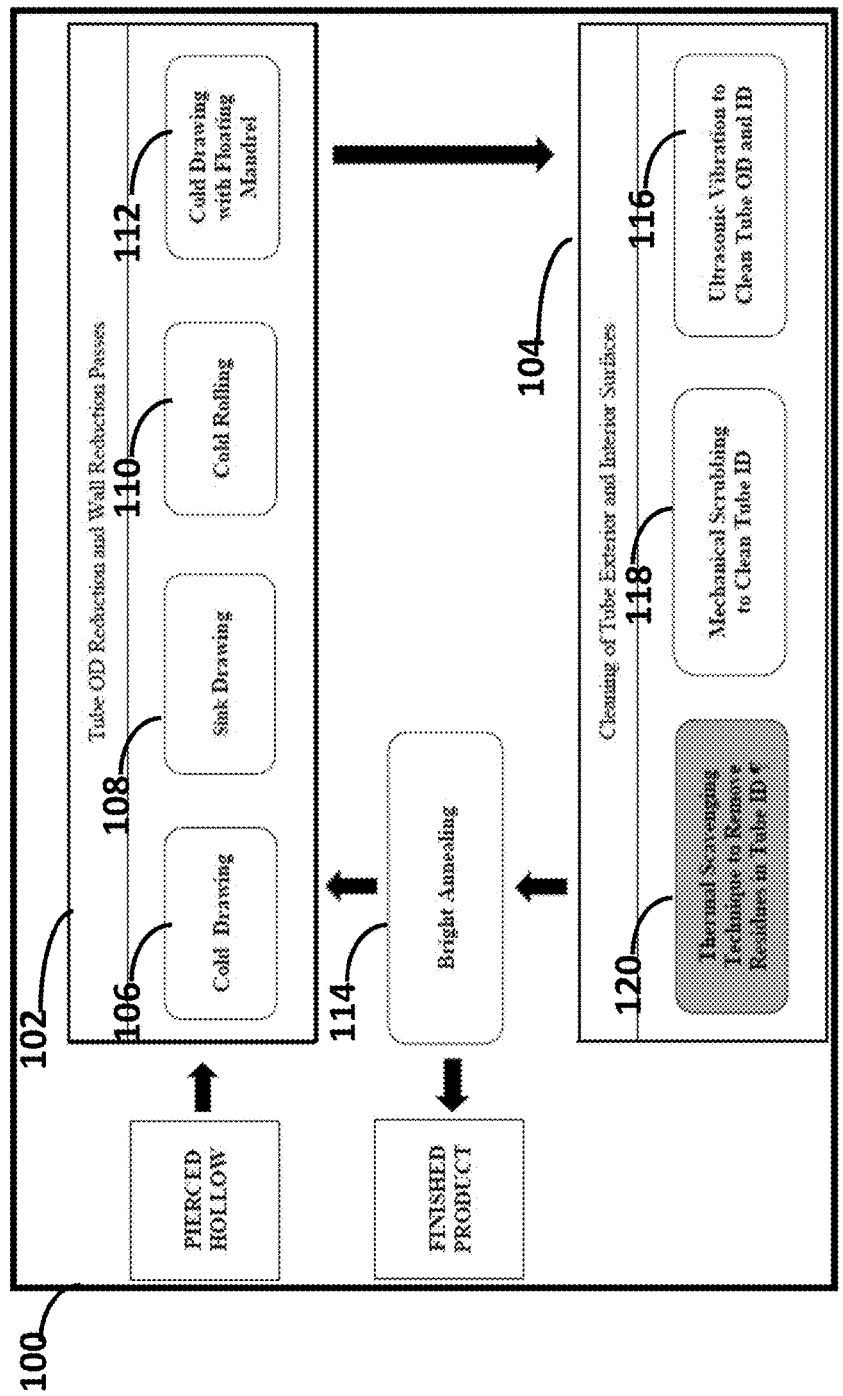
FIG. 1 illustrates the schematic diagram for the production of bright-annealed stainless steel seamless tube.

Schematic Diagram for Production of Bright-Annealed Stainless Steel Seamless Tube FIG. 1 illustrates the schematic diagram for production of bright-annealed 114 stainless steel seamless tube. Traditionally, the production of stainless steel seamless tube relied primarily on cold drawing machines, used fossil-fuel-fired furnaces to anneal the tube, and a pickling process to remove the oxide layer on the tube surface. Because of environmental concerns, hydrogen-nitrogen-fired annealing process as known as bright annealing process 114, has been considered as an alternative. As shown in FIG. 1, the production of bright-annealed 114 stainless steel seamless tube consists of two steps: the tube outer diameter reduction and wall reduction pass 102; followed by the annealing and subsequent cleaning of the tube exterior and interior surfaces 104. The two steps (102 & 104) can be repeated many times to reach the final tube size. For each pass, depending on the desirable tube reduction for this pass, the tube outer diameter and wall reduction tasks can be accomplished by selecting one of the following tools:

i. Cold drawing with both outer and inner mandrels☐ 106.
    ii. Sink drawing with outer mandrel 108.
    iii. Cold rolling or pilgering 110.
    iv. Cold drawing with outer mandrel and inner floating mandrel 112.

Cold rolling 110 is employed to reduce tube outer diameter and wall in the production of bright annealed stainless seamless tube. The application of rolling machine requires the use of high viscosity heavy lubricants and this left behind remnant lubricant particles on the interior of the tube. The common method employed to eliminate the lubricant residue from the exterior and interior of tube surface is the mechanical scrubbing scheme 118. Tightly squeezed sponge or cotton balls, soaked with chemical solvent such as acetone and inserted in one end of the tube, shot through the tube bore by a high-speed gas gun.

Further, ultrasonic vibration 116 is also employed to remove the blob of lubricant residue from the interior of tube surface. For ultrasonic cleaning 116, tubes are placed in a tank and soaked in warm and soaping water and are subjected to high frequency vibrations for hours to shake away remnant lubricant from the tube surface. For better cleaning results, tubes are subjected to ultrasonic vibration 116 first and then followed by mechanical scrubbing 118. However, for small outer diameter of the tubes, these methods failed to eliminate the very thin film of lubricant remnant present on the interior surface of the tube. As a very thin layer, known as boundary layer, of remnant lubricant still firmly stuck to the tube surface. The thickness of this layer, depending on the lubricant viscosity and rolling pressure or tube reduction ratio, varies from a few micrometer to less than one micrometer. This thin film of remnant lubricant caused slight but uniform discoloration on the interior surface of the tube.

To overcome the above mentioned drawbacks of the prior art, the present invention employs thermal scavenging technique 120 for removing the thin film of remnant lubricant from the interior of the tube. The thermal scavenging technique 120 entails basically the following two schemes:

i. For each batch of tubes to be fed to the traditional bright annealing furnace, atmospheric air in the tube interior must be replaced with hydrogen/nitrogen mixture. This is accomplished by the hydrogen blowing rack, with the main manifold connected to the hydrogen/nitrogen source and multiple branch outlets plugged to the tailing ends of the tubes to be annealed by flexible rubber hoses. After purging of atmospheric air from the leading ends of the tubes, a lighter is then used to ignite the hydrogen/nitrogen mixture at the outlet of tube's leading ends to insure that the entire length of tube is filled with hydrogen/nitrogen.

ii. Beginning with the leading ends, tubes then move into the bright annealing furnace and receive standard heat treatment. The interiors of tubes filled with pure hydrogen/nitrogen will reach annealing temperature (~1050° C.); remnant hydrocarbons imbedded in the thin boundary layer stuck to the tube interior surface will be burned off in an inert environment. Since annealing furnaces always maintain a slightly positive pressure difference to prevent intrusion of ambient atmospheric air, the products of the combustion will be slowly scavenged out from the tailing ends of the tubes to the outside atmosphere.

Pictorial Represenations of the Thermal Scavenging System

Figure 2A:
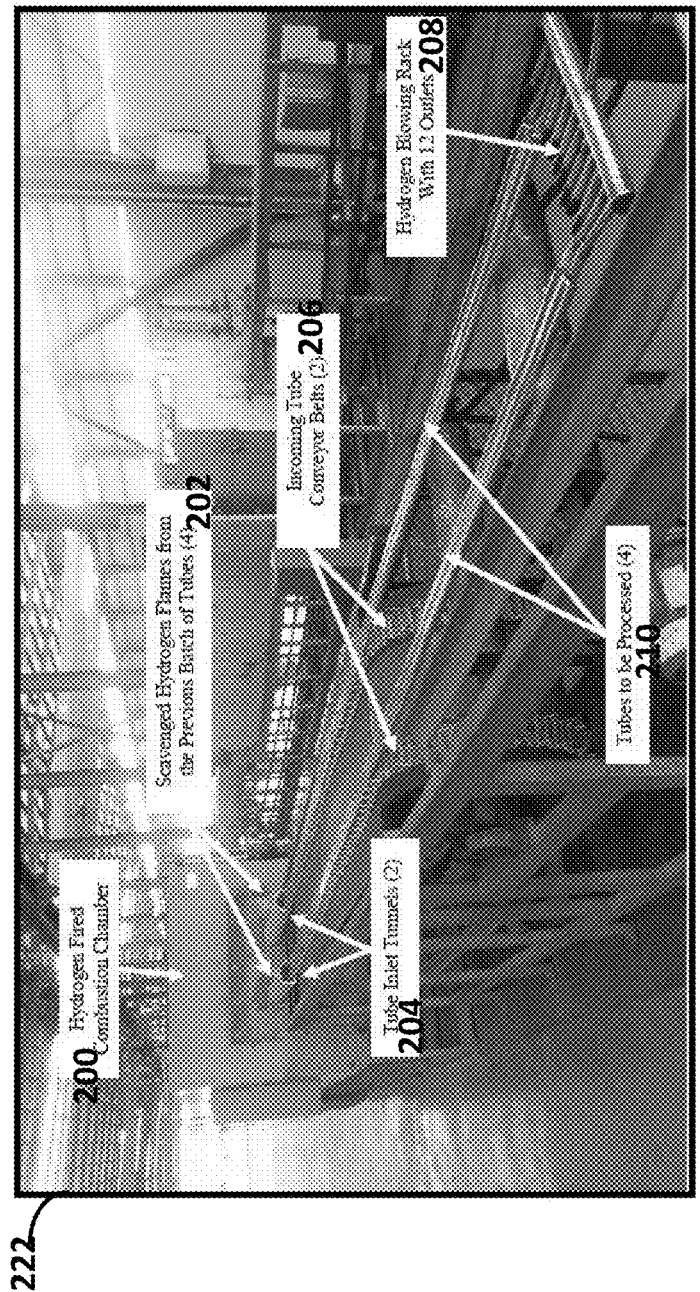
FIG. 2A illustrates the over view of the thermal scavenging system, retrofitted to an existing hydrogen-fired annealing furnace, according to the embodiments as disclosed herein.
Figure 2B:
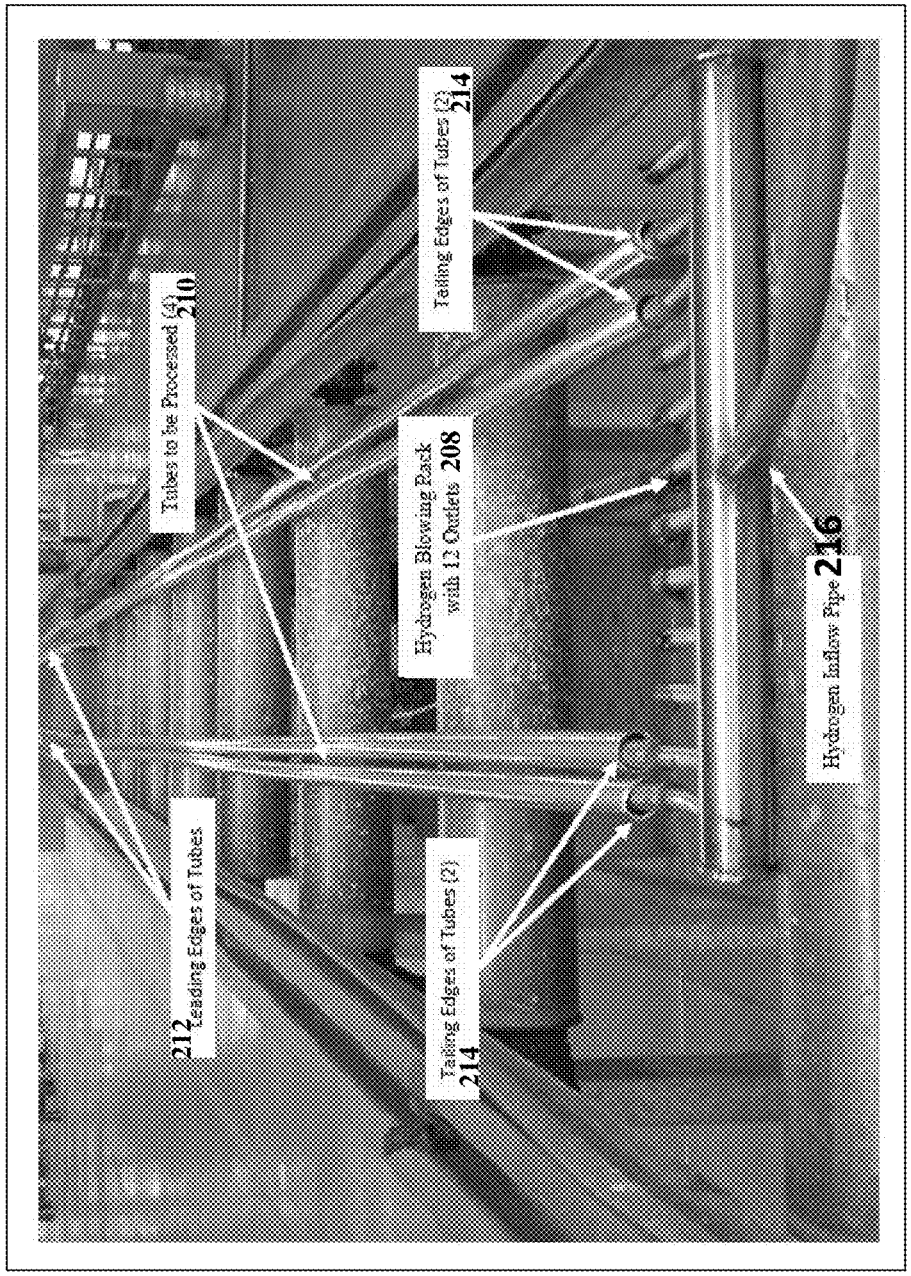
FIG. 2B illustrates the expanded view at one end of the thermal scavenging system, according to the embodiments as disclosed herein.
Figure 2C:
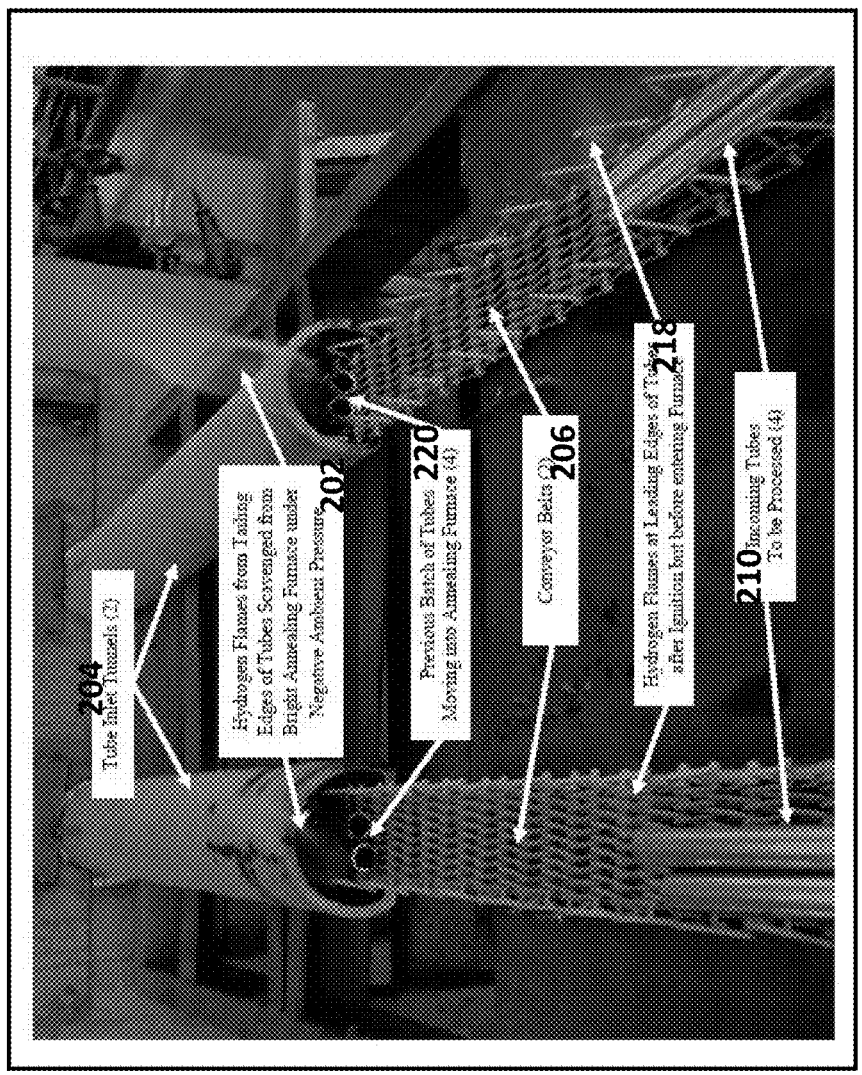
FIG. 2C illustrates the expanded view at other end of the thermal scavenging system, according to the embodiment of the present invention.

FIGS. 2A-2C are pictorial representations of cleaning the interior of the tube using thermal scavenging system 222, according to the principle embodiment of the present invention.

Specifically, FIG. 2A illustrates the over view of the thermal scavenging system, retrofitted to an existing hydrogen-fired annealing furnace, according to the embodiments as disclosed herein. FIG. 2B illustrates the expanded view at one end of the thermal scavenging system, according to the embodiments as disclosed herein.

The thermal scavenging system 222 comprises of a hydrogen blowing rack with a main manifold and multiple branch outlets, rubber hoses 208 and a lighter (not shown).

At one end of the thermal scavenging system, hydrogen blowing rack 208 is placed, and at the other end hydrogen burned combustion chamber 200 is present with two inlet tunnels 202 placed at the front end of the hydrogen combustion chamber 200. A conveyor belt 206 is present in between the hydrogen combustion chamber 200 and hydrogen blowing rack 208. The batch of tubes to be processed 210 is placed on the conveyer belt 206. The tailing ends 214 of these tubes 210 are connected to the outlet nozzles of the hydrogen blowing rack 208 by flexible rubber hose. The main manifold of the hydrogen blowing rack 208 is connected to a hydrogen inflow pipe 216 through which the hydrogen/nitrogen mixture will be continuously pumped, from the tailing ends 214 to the leading ends 212, into the tubes placed on the conveyor belt 206.

After placing the incoming tubes to be processed 210 on the conveyor belt 206, the lighter is used to ignite the hydrogen gas emerging from the leading edge 212 of the tubes 210 generating hydrogen flames before entering the furnace 218 as shown in FIG. 2C. This is to insure the interiors of tubes are completely filled with hydrogen/nitrogen mixture.

FIG. 2C illustrates the expanded view at other end of the thermal scavenging system, according to the embodiment of the present invention.

After the nearly complete entrance of the previous batch of the tubes into the annealing furnace 220, the hydrogen flames from the tailing ends of tubes from the previous batch 202 can be seen, illustrating combustion products of remnant lubricant scavenged from the tube interiors under negative ambient pressure.

Pictorial Representation of Hydrogen Blowing Rack with Outlets

Figure 3A:
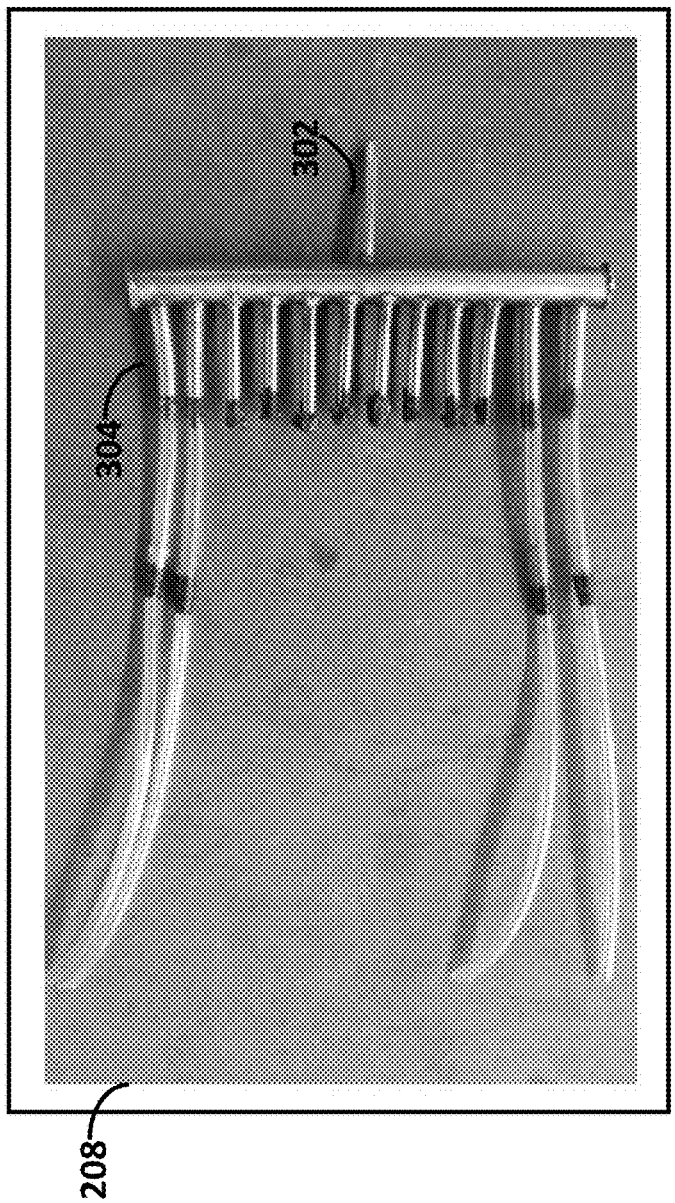
FIG. 3A illustrates the hydrogen blowing rack with 4 outlets of the thermal scavenging system, according to the embodiment of the present invention.
Figure 3B:
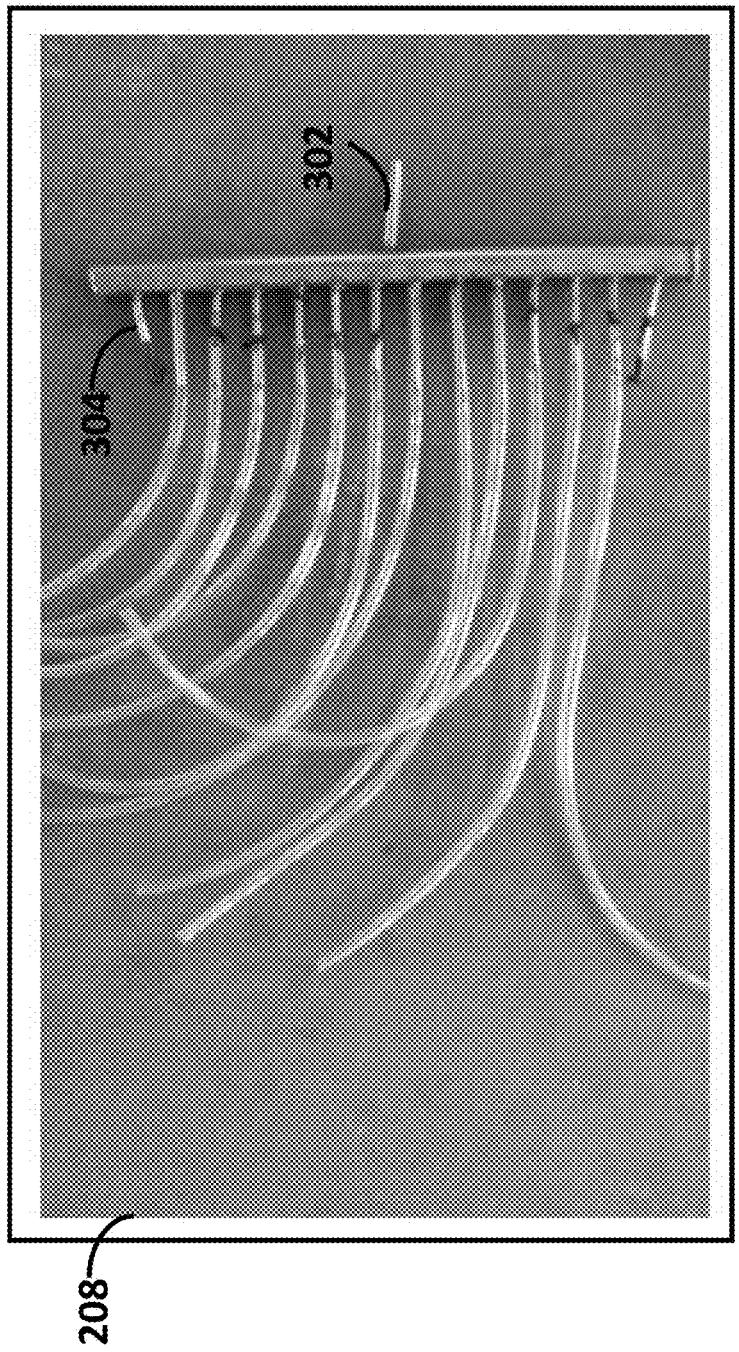
FIG. 3B illustrates the hydrogen blowing rack with 12 outlets for the thermal scavenging system, according to the embodiment of the present invention.

FIG. 3A illustrates the hydrogen blowing rack 208 with four outlets and FIG. 3B illustrates the hydrogen blowing rack 208 with twelve outlets, according to one embodiment of the present invention.

Each end of the outlet is placed in the tail end 216 of the processing tube 214. The hydrogen-blowing rack contains a hydrogen gas input nozzle 302 at one end and at least one flexible output nozzles 304.

Figure 4:
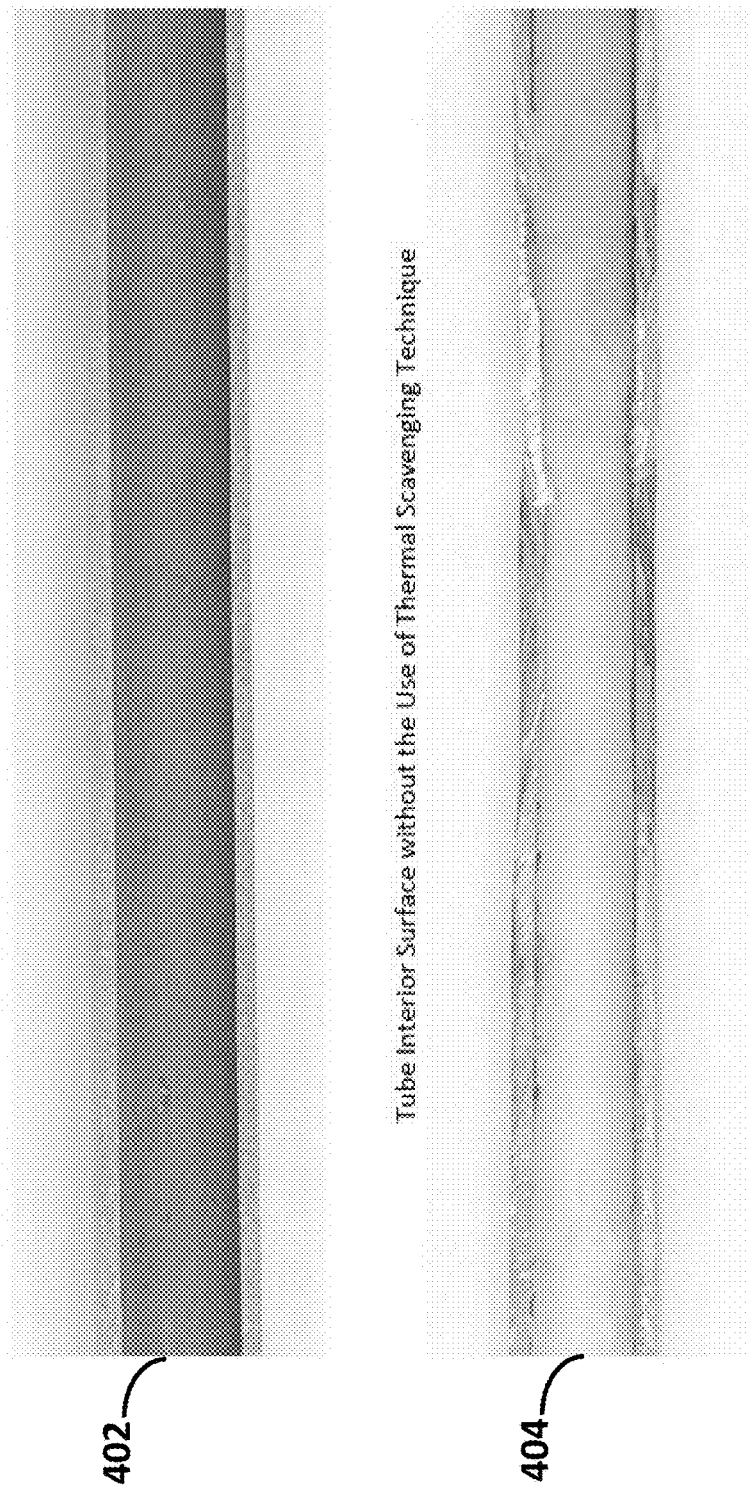
FIG. 4 illustrates the comparison of tube surface finishes before and after applying thermal scavenging technique, according to the embodiment of the present invention.

Pictorial Representation of a Tube Before and After the Thermal Scavenging Technique FIG. 4 illustrates the comparison of tube surface finishes before and after applying thermal scavenging technique, according to one embodiment of the present invention.

The thermal scavenging technique 402 shows the tube surface before applying the thermal scavenging technique and 404 shows the surface after applying the thermal scavenging technique. The improvement in surface finish with the use of thermal scavenging technique is significant. With the thin film of remnant lubricant removed, the yellowish discoloration is no longer present. More important, the unique luster of nickel metal has been restored, thus enhancing the esthetic value. In addition, complete elimination of remnant lubricant by high temperature combustion will offer hydrocarbon-free extra clean tube interior.

Operational Flow Diagram

Figure 5:
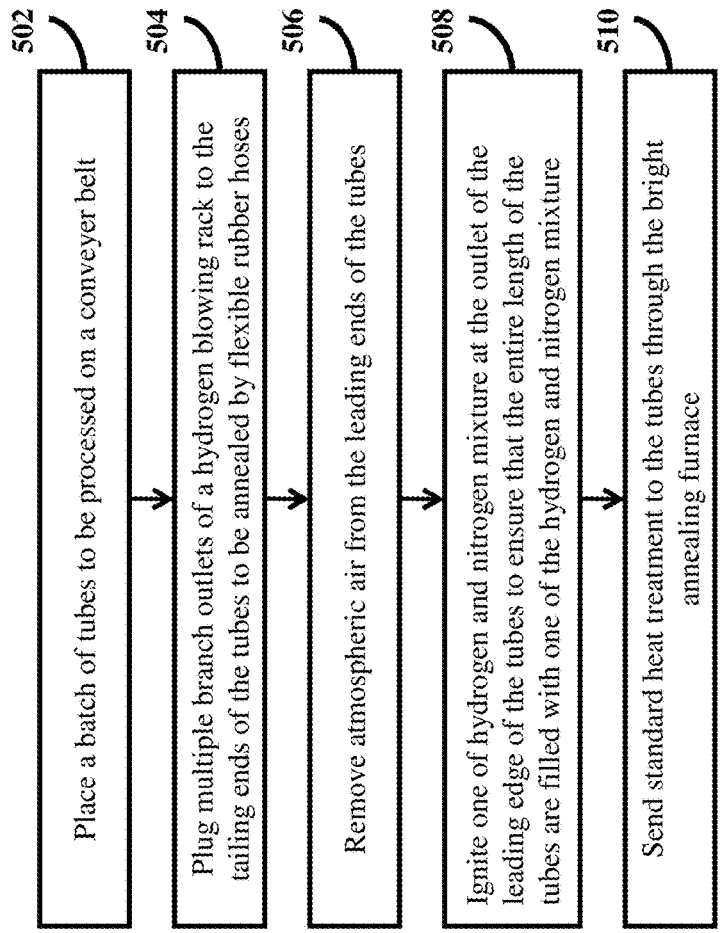
FIG. 5 is a flow diagram illustrating a method for removing remnant lubricant contaminants from the interior surface of steel tubes, according to one embodiment of the present invention.

FIG. 5 is a flow diagram illustrating a method for removing remnant lubricant contaminants from the interior surface of steel tubes, according to one embodiment of the present invention. The flow diagram begins at step 502.

At step 502, a batch of tubes to be processed is placed on a conveyor belt.

At step 504, multiple branch outlets of a hydrogen blowing rack are plugged to the tailing ends of the tubes to be annealed by flexible rubber hoses.

At step 506, atmospheric air is removed from the leading ends of the tubes.

At step 508, one of hydrogen and nitrogen mixture at the outlet of the leading edge of the tubes to ensure that the entire lengths of the tubes are filled with one of the hydrogen and nitrogen mixture is ignited.

At step 510, standard heat treatment to the tubes through the bright annealing furnace is sent.

The method ends at step 510.

The present invention can be thus used in applications, such as for fuel trains for automotive engine where extra clean tube is required or piping in high-tech semiconductor fabrication shops where hydrocarbon-free component is necessary. Although an illustrative embodiment of the invention has been shown and described, it is to be understood that various modifications and substitutions may be made without departing from the novel concept and scope of the present invention.

Accordingly, the disclosure of the present invention is intended to be illustrative, but not limiting, of the scope of the invention, which is set forth in the following claims.

The invention claimed is:

1. A system to remove remnant lubricant contaminants from an interior surface of steel tubes produced in a bright annealing furnace, the system comprising:
a plurality of tubes to be processed, the plurality of tubes having a plurality of leading ends and a plurality of tailing ends, wherein each tube has a leading end and a tailing end;
the bright annealing furnace at the plurality of leading ends of the plurality of tubes;

a hydrogen blowing rack at the plurality of tailing ends of the plurality of tubes, the hydrogen blowing rack comprising
  a plurality of outlets on one end of the hydrogen blowing rack, each outlet placed at the tailing end of one respective tube out of the plurality of tubes, to blow one of a hydrogen and nitrogen gas into the plurality of tubes to drive atmospheric air out from the plurality of leading ends of the plurality of tubes,
  a main manifold comprising the plurality of outlets,
  rubber hoses between the plurality of outlets and the plurality of tailing ends of the plurality of tubes, and also connecting the plurality of outlets with the plurality of tailing ends of the plurality of tubes and for unplugging the plurality of tailing ends of the plurality of tubes from the plurality of outlets before the plurality of tubes approach an entrance of the bright annealing furnace, and
  a gas input nozzle at another end of the hydrogen blowing rack, wherein the gas input nozzle is connected to the main manifold for receiving the gas;
a conveyor belt placed in between the hydrogen blowing rack and the bright annealing furnace for holding the plurality of tubes;
two inlet tunnels between the bright annealing furnace and the plurality of leading ends of the plurality of tubes for receiving the plurality of tubes placed on the conveyor belt, wherein the plurality of tubes enter into the two inlet tunnels along with the conveyor belt; and
a lighter placed at the plurality of leading ends of the plurality of tubes to ignite the gas emerging from the plurality of leading ends of the plurality of tubes before entering the bright annealing furnace to test and to ensure the plurality of tubes are entirely filled with the gas.

* * * * *